April 21, 1970 J. R. BOYKIN 3,508,060

LIGHT FREQUENCY RECEIVER

Filed Jan. 14, 1965

WITNESSES

Theodore F. Wrobel

James F. Young

INVENTOR

John R. Boykin

BY Ernest P. Klipfel

ATTORNEY 3,508,060

LIGHT FREQUENCY RECEIVER

John R. Boykin, Arnold, Md., assignor to Westinghouse Electric Corporation, Pittsburgh, Pa., a corporation of Pennsylvania Filed Jan. 14, 1965, Ser. No. 425,585
Int. Cl. H04b 9/00
U.S. Cl. 250—199 12 Claims

ABSTRACT OF THE DISCLOSURE

A light frequency receiver for detecting a subcarrier signal which frequency modulates a coherent light beam. The receiver seperates the beam into two differently directed components which are recombined after traveling different path lengths. The difference in path is made substantially equal to one-half wave length of the subcarrier frequency so that as one component advances in phase the other component will be retarded in phase to the same extent. The two components are vectorially added to provide a resultant having an amplitude which will vary in accordance with the subcarrier signal. To maximize the amplitude out of the system the path difference between the light components is adjusted to be equal to an odd multiple of quarter wave lengths at the light frequency.

The present invention relates generally to light frequency receivers and more particularly relates to apparatus for converting frequency modulated light to amplitude modulated light.

The advent of the laser provides a space coherent beam which can be collimated to extremely narrow bandwidths and sent over long paths with little loss except absorption in the atmosphere. For the first time a light frequency signal is available which is time coherent, or which in more familiar terms has excellent frequency stability.

Receivers for a frequency modulated light beam may be divided into two general classes. Those which operate directly at light frequency, and those which heterodyne to a lower (IF) frequency. In either class, it is necessary that a coherent light beam such as the output from a laser be utilized. Frequency modulation of the coherent light beam itself presents severe difficulties in maintaining correct phase relationships at the light frequency under conditions of path variations and with thermal changes in the equipment. One such system uses a locally generated laser beam at a slightly different frequency, as a local oscillator. The beam frequency between this local laser and the incoming modulated light beam is detected by a photocell and the difference amplified as an intermediate frequency. It is extremely difficult, however, to maintain the proper frequency difference between the two light beams. Another system involving phase locking the local laser to the incoming light beam is extremely difficult to accomplish. Still other methods involve transmitting a separate beam of unmodulated light to be used as a reference. Here, the use of two paths with the necessity of doubling the optical equipment with no corresponding advantages over amplitude modulation merely provides added expense and complexity.

Direct frequency modulation of the light beam at ultrahigh frequency is not considered practical at the present time. Any of the schemes which produces such frequency shift apparently produces excessive amplitude modulation at the same time. The light beam, however, can be phase modulated by a subcarrier signal. In such an arrangement, the coherent light beam is phase modulated with a subcarrier signal which itself is modulated by the intelligence signal. Phase modulation is a form of frequency modulation. In fact the light beam is frequently frequency modulated by a subcarrier which itself will be frequency modulated by the intelligence signal. The actual subcarrier frequency may be of any suitable range such as for example in the UHF frequency range. One such apparatus for demodulating a microwave frequency modulated light by converting it to microwave amplitude modulated light is as described by S. E. Harris in Applied Physics Letters, volume 2, page 47, February, 1963 entitled "Conversion of FM Light to AM Light Using Birefringent Crystals." As more fully defined therein, a crystal of calcite between Nicol prisms detects frequency modulation of the coherent light beam by the subcarrier by a decrease or increase of the average transmitted intensity of the light beam. The crystal is biased and chosen to be of such a length that the average intensity of the light through the analyzer equals 50% at the carrier frequency and as the frequency swings about this point, amplitude variations result.

Briefly, the present invention detects a subcarrier signal which frequency modulates a coherent light beam by separating the beam into two differently directed components which are recombined after traveling different path lengths. The difference in path is made substantially equal to one-half wave length of the subcarrier frequency so that as one component advances in phase the other component will be retarded in phase to the same extent. The two components are vectorially added to provide a resultant having an amplitude which will vary in accordance with the subcarrier signal. In order to maximize the subcarrier amplitude out of the system, each light component is adjusted so that the path difference between the light components is equal to an odd numbered multiple of quarter wave lengths at the light frequency.

Another embodiment of the invention provides apparatus for continually controlling the difference in path taken by each light component as intelligence is being received and measured for amplitude.

Accordingly, an object of the present invention is to provide apparatus for converting phase modulation on a coherent light beam at a subcarrier frequency to amplitude modulation in a simple, inexpensive manner.

Another object of the present invention is to provide a detector for a frequency modulated subcarrier signal which modulates a coherent light beam.

Another object of the present invention is to provide apparatus for detecting the frequency modulation of a coherent light beam and making use of the time coherence of the laser output.

Another object of the present invention is to provide a detector for the frequency modulated coherent light beam free from deleterious effects of strain in crystals.

Another object of the present invention is to provide a frequency modulated coherent light beam detector which is less responsive to thermal changes in the equipment.

These and other objects will be readily apparent from the following detailed description taken in conjunction with the drawing, in which.

Figure 1:
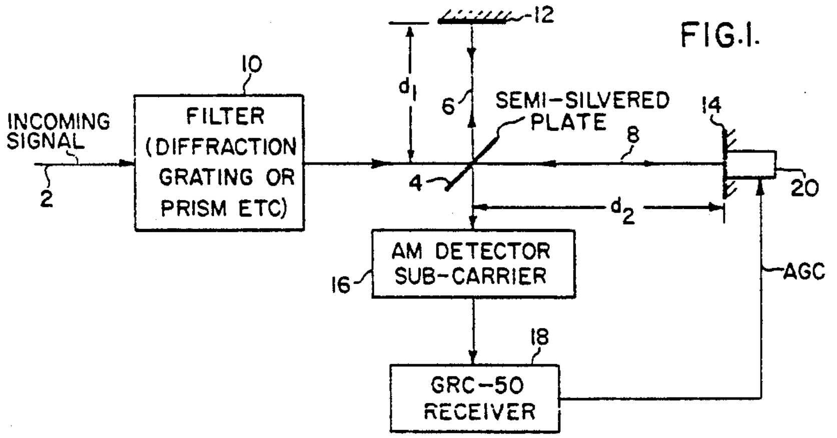
FIGURE 1 is a schematic block diagram of an illustrative embodiment of the present invention.

Referring to FIG. 1, apparatus is illustrated for detecting a coherent light beam which is frequency modulated by a subcarrier signal which in turn may be modulated by an intelligence signal. The apparatus converts the frequency modulated coherent light beam to the amplitude modulated signal at the subcarrier frequency.

More specifically, the coherent light beam 2 is directed to a beam splitter 4 which separates the beam into two differently directed components 6 and 8. When desirable, a filter 10 such as a defraction grating or prism may be used to separate the coherent light beam 2 from noise and the like. A reflector 12 is positioned in the path of the first component of light 6 at a distance $d_1$ from the beam splitter 4 for returning the first component to the beam splitter. A reflector 14 is positioned in the path of the second component of light 8 at a distance $d_2$ from the beam splitter 4 for returning the second component to the beam splitter 4. The two beam components are then recombined at the beam splitter and directed to an amplitude modulation detector 16. The detector 16 which may be a simple photomultiplier tube will provide an amplitude varying signal at the subcarrier frequency to the antenna terminals of a standard radio receiver 18.

The reflector 12 and 14 are so mounted in the path of each component 6 and 8 that when the distance $d_1$ and the distance $d_2$ are adjusted the difference $$d_2-d_1=\frac{\lambda_m}{2\pi}\sin^{-1}\left(\frac{\pi}{4M}\right)$$

where $\lambda_m$ is the wave length of the subcarrier frequency and M is the index of modulation impressed on the subcarrier frequency.

Assuming a modulation index of $\pi/4$, which will provide maximum amplitude output in a manner as to be described hereinafter, the difference in the distance of each reflector from the beam splitter will be $$d_2-d_1=\frac{\lambda_m}{2\pi}\sin^{-1} \qquad (1)$$

or $$d_2-d_1=\frac{\lambda_m}{2\pi}\frac{\pi}{2}$$

so that $$d_2-d_1=\frac{\lambda_m}{4\pi}$$

Since the component of light traveling the path $d_2$ is the quarter wave length longer, the total path difference between the distances $d_2$ and $d_1$ is equivalent to a half wave length of the subcarrier frequency.

Figures 2, 3:
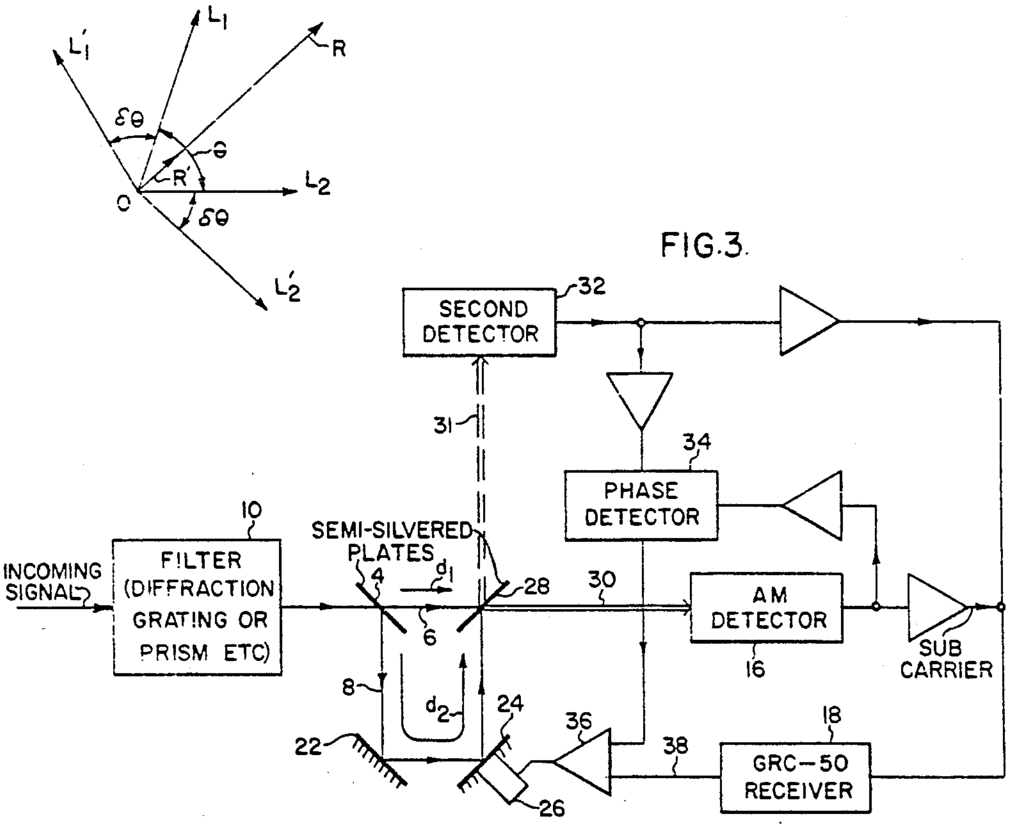
FIG. 2 is a vector diagram illustrating the manner in which the present invention obtains the desired results.
FIG. 3 is a schematic block diagram of an alternate embodiment of the present invention.

Suppose that in the unmodulated condition the difference in path length of the two components returning at the beam splitter 4 and hence to the detector 16 is $(2n\pi+\theta)$ radians at the light frequency, and is one-half wave length at thesubcarrier frequency as shown above. The vector of each light component may be represented as shown in FIG. 2 by $OL_1$ and $OL_2$ respectively. The resultant of these vectors may be represented by the magnitude of the line OR; R being determined in the usual manner by resolving the light components $OL_1$ and $OL_2$ vertically and horizontally and taking the root of the sum of the squares. Assuming that phase modulation is applied to the light beam at the subcarrier frequency rate, the phase of the light component $OL_1$ at any instant may be advanced by $\delta\theta$ to a new position $OL'_1$. At the same instant of time, however, the phase of the light component $OL_2$ will be retarded by a similar angle $\delta\theta$ because the difference in path length traveled by the components is one-half wave length at the subcarrier frequency and, in the time which the light takes to travel the extra half wave length, the phase of the subcarrier frequency signal will change $\pi$ radians. The resultant vector OR' will obviously have a different length of magnitude than the resultant vector OR; and the subcarrier can therefore be recovered in the AM detector 16.

It is important to note that the relative phase difference between the vectors $OL_1$ and $OL_2$ does not effect the conversion of phase modulation to amplitude modulation. While the magnitude of the change in the resultant vector OR and the harmonic content does depend upon the angle $\theta$, one can draw vector diagrams to show that there will always, for practical purposes, be some change in subcarrier frequency output except if the angle $\theta$ is exactly equal to zero or $\pi$ radians.

If the modulation index cannot be made as high as $\pi/4$, the equation for the spacing $d_2-d_1$ cannot be satisfied and the spacing must then be set at $\lambda_m/4$ or a quarter wave length of the modulating subcarrier frequency to maintain the resulting amplitude modulation as high as possible.

It is desirable that the phase between the two light component vectors be kept at an angle $\theta=\pi/2$ radians for the greatest maximum subcarrier amplitude output at the subcarrier frequency and minimum harmonic content. With the two light components 6 and 8 falling on the detector 16 approximately in phase quadrature, the relative phase shift between the two components will either increase or decrease the total amount of light depending on the direction of the shift. When the light beam is then modulated the phase difference between the two components arriving at the detector 18 can be made to go through excursions of ±90° for a modulation index of $\pi/4$ or more. This will result in amplitude modulation of 100%.

A vernier micrometer adjustment may be provided to fix the distance separating the beam splitter 4 and one of the reflectors such as 14. This change in path length of the component 8 is, of course, completely negligible at the subcarrier frequency and it will have no noticeable effect on the relative modulation phase of the two light component vectors.

Due to thermal perturbations, however, this condition may not remain even if carefully set. The adjustment could be easily made, however, if the reflector 14 can be adjusted in position by plus or minus one quarter wave length of the light frequency. The movement is readily accomplished by, for example, a magnetostrictive device 20 attached to the reflector 14, or by fabrication of the reflector 14 by polishing and silvering the end of a piece of piezoelectric material whose dimensions could be changed by an electrostatic voltage. The content current for a magnetostrictive material or the voltage for a piezoelectric material may be readily obtained from automatic gain control of the receiver 18 and would adjust the reflector position for maximum subcarrier amplitude in the radio receiver.

Another embodiment of the present invention is as illustrated in FIG. 3. For purposes of clarity like components have been identified with the same reference characters. The light component 8 has now positioned in its path a reflector 22 in a fixed position and a reflector 24 whose position can be adjusted by the transducer 26 in a manner similar to that discussed with reference to FIG. 1.

A second beam splitter 28 positioned at the location where each light component 6 and 8 are recombined again separates the recombined beam into two differently directed components 30 and 31. The first component 30 is the output discussed previously with respect to FIG. 1 directed to the AM detector 16. The second component 31, illustrated in dotted lines, is directed to a second detector 32, the output of which is combined with the output of the detector 16 in phase detector 34 to provide a sensing signal to the mirror adjustment 26 through the amplifier 36. The amplifier 36 may additionally sum the automatic gain control signal 38 from the receiver 18 to provide a more exact control signal for the position of the reflector 24.

The apparatus of FIG. 3 overcomes a difficulty common in many detectors; namely, that the semi-silvered reflectors or beam splitters will allow some light to be reflected in unwanted directions thereby reducing the sensitivity of the system.

For purposes of clarity and to demonstrate the order of the dimensions utilized in the present invention, a subcarrier frequency of 1000 megacycles/sec. may be assumed. The actual frequency used is not critical. The path difference of each component 6 and 8 at the modulating frequency of one kilomegacycle will be approximately six inches since the wave length $\lambda_m$ would be approximately one foot. The operating bandwidth at one kilomegacycle would be several hundred megacycles, therefore one may frequency multiplex several UHF subcarriers between 800 and 1,200 megacycles on the same laser beam.

The distance necessary to move one or the other of the reflectors by $\pm$ one quarter wave length at the light frequency would be in the order of $\pm 1.6 \times 10^{-5}$ centimeters or a total excursion of a little over ten millionths of an inch. It can be seen that the adjustment of the path with respect to the light frequency is completely negligible with respect to the adjustment for the subcarrier frequency and will have no noticeable affect on the relative modulation phase of the two light component vectors.

The present invention makes use of the extremely good time coherence or frequency stability of the laser. During the time taken for the light beam to travel the extra six inches (about $5 \times 10^{-10}$ seconds), the frequency stability must remain within the order of a few parts in $10^8$ to avoid excessive phase modulation noise on the subcarrier. At 6500 angstrom units (red light), the frequency is approximately $4.6 \times 10^{14}$ cycles per second. In $5 \times 10^{-10}$ seconds, $2.3 \times 10^5$ periods of the light frequency occur, or the light phase moves through about $1.45 \times 10^6$ radians. A stability of 1 in $10^8$ for this time would give a differential phase shift of the order of $1.4 \times 10^{-2}$ radians or about 38 db (peak) signal to noise ratio. Over the relatively narrow bandwidth of the RF receiver 18 this would, of course, be improved to in the order of 70 db.

The present invention has particular advantage when used with a carrier frequency of several hundreds of megacycles since reasonable working dimensions are then available. Because of the high frequency of the light beam, the present invention is particularly adapted to the reception of signals frequency modulated on a light beam by a carrier having a bandwidth that is small compared to the frequency of the carrier. If the bandwidth is greater than say 10% the light beam would arrive before the modulation has hardly begun. The present invention performs the detection using the signal itself, after a suitable delay, as a reference.

Although the foregoing invention has been described with a degree of particularity for the purposes of illustration, it is to be understood that all modifications, alterations and substitutions within the spirit and scope of the present invention are herein meant to be included.

I claim as my invention:

1. Apparatus for detecting a subcarrier signal which frequency modulates a coherent light beam comprising, in combination; means for separating the beam into two differently directed components; means for making the difference in path traveled by each component substantially equal to one-half wave length of the subcarrier frequency; and means terminating the path of each component for providing an output responsive to magnitude of the resultant of said components at termination.

2. The apparatus of claim 1 including means for adjusting said path difference to be substantially an odd numbered multiple of quarter wave lengths of said light beam.

3. Apparatus for converting phase modulation on a coherent light beam at a subcarrier frequency to amplitude modulation, comprising in combination; means for separating the beam into two differently directed components; means for making the difference in path traveled by each component substatnially equal to one-half wave length of the subcarrier frequency; means for making the two components out of phase with each other upon termination of their respective paths; and means terminating the path of each component for providing an output responsive to the magnitude of the vectorial addition of said components as they vary in phase in equal but opposite directions in response to phase modulation by the subcarrier signal.

4. Apparatus for converting a coherent light beam which is phase modulated at a subcarrier frequency to amplitude modulated light comprising, in combination; a beam splitter for separating the beam into two differently directed components; a first reflecting means for returning one of said components to said beam splitter; a second reflecting means for returning the other of said components to said beam splitter; means for positioning said first and second reflecting means predetermined distances from said beam splitter; the difference in distances being substantially equal to one-quarter wave length of the subcarrier frequency and an integer number of one-eighth wave lengths of the light beam frequency where said integer number is two or six; said beam splitter redirecting in the same direction, a portion of each component; and means responsive to said portion of each component for vectorially adding said portions as each varies in phase in equal but opposite directions in accordance with the phase modulation on the coherent light beam to provide an amplitude modulated output signal.

5. Apparatus for converting a coherent light beam which is frequency modulated at a subcarrier frequency rate to an amplitude modulated light beam, comprising in combination; means for separating the beam into two differently directed components; means for making the two components out of phase with each other with respect to the light frequency; means for making each component with respect to the subcarrier frequency substantially equal to $\pi$ radians out of phase with each other; and means for recombining each component whereby as the phase of one component is advanced the phase of the other component will be retarded an equal amount in response to the subcarrier frequency signal.

6. An apparatus for converting phase modulation on a coherent light beam at a subcarrier frequency to amplitude modulation comprising, in combination; a first beam splitter for separating the beam into two differently directed components; a second beam splitter disposed in the path of one of said components; reflecting means disposed in the path of the other of said components for redirecting said other components to said second beam splitter to thereby recombine each component; said second beam splitter separating the recombined beam into another two differently directed components; first detecting means responsive to the magnitude of the vectorial addition of one of said another two differently directed components as its parts vary evenly and oppositely from their fixed relationship with each other; a second detecting means responsive to the magnitude of the vectorial addition of the other of said another two components as its parts equally and oppositely from their fixed relationship with each other; and means responsive to the relative magnitude of the vectorial addition at each detecting means for providing a sensing signal to adjust the path length of said other of said differently directed components.

7. Apparatus for converting phase modulation on a coherent light beam at a subcarrier frequency to amplitude modulation comprising in combination; a first beam splitter for separating the coherent light beam into two differently directed components; a second beam splitter for terminating the path of one of said components; reflecting means in the path of said other component for redirecting said other component to said second beam splitter; said second beam splitter recombining a portion of each of said components in a chosen direction; light amplitude responsive detector means disposed in said chosen direction for receipt of the parts of each component directed thereto for vectorially adding the parts as they vary equally and oppositely from their fixed relationship with each other in response to the intelligence modulation of the subcarrier frequency signal; and means for adjusting said reflecting means in the path of said second component in response to the subcarrier amplitude sensed by said sensing means to change the path length of said second component so that the path difference is substantially equal to one-quarter wave length of the light frequency.

8. The apparatus of claim 7 wherein said reflecting means is positioned in the path of the second component to make the path difference of each component substantially equal to one-half wave length at the subcarrier frequency.

9. Apparatus for converting a coherent light beam which is frequency modulated by a subcarrier signal to an amplitude modulated light beam comprising, in combination; means for separating the beam into two differently directed components; and means for recombining said components when the components are substantially 180° out of phase with each other with respect to the subcarrier frequency and in quadrature with each other with respect to the light frequency.

10. Apparatus for converting a coherent light beam which is frequency modulated by a subcarrier frequency signal comprising, in combination; means for separating the beam into two differently directed components; reflecting means in the path of each component for recombining each component at said means for separating; the difference between the distance each reflecting means is located from said means for separating being equal to an odd multiple of quarter wave lengths of the light frequency and approximately a distance equal to $$\frac{\lambda_m}{2\pi}\sin^{-1}\frac{\pi}{4M}$$

where $\lambda_m$ is the wave length of the modulating subcarrier frequency and M is the index of modulation of the light beam expressed in radians.

11. The apparatus of claim 10 wherein the modulating index is $\pi/4$ radians or less.

12. Apparatus for detecting frequency modulation of a coherent light beam by a subcarrier frequency signal upon which intelligence is placed in a modulated manner, comprising in combination; a beam splitter for separating the beam into two differently directed components having paths perpendicular to each other: a first reflecting means disposed perpendicular to the path of said first component for redirecting the component back to said beam splitter; a second reflecting means disposed perpendicular to the path of said second beam for redirecting the second component back to said beam splitter; the difference between the distance each reflecting means is located from said beam splitter being equal to an odd multiple of quarter wave lengths of the light frequency and substantially a quarter wave length of the modulating frequency.

References Cited

UNITED STATES PATENTS

| | | | |
|---|---|---|---|
| 1,709,809 | 4/1929 | Rashevsky | 250—199 X |
| 2,265,784 | 12/1941 | Von Baeyer | 250—199 |
| 3,233,108 | 2/1966 | Rosenblum | 250—199 |
| 3.302.027 | 1/1967 | Fried et al. | 250—199 |
| 908,725 | 1/1909 | Ashley | 329—144 |

ROBERT L. GRIFFIN, Primary Examiner

A. J. MAYER, Assistant Examiner